(12) United States Patent
Kobayashi

(10) Patent No.: US 7,010,007 B2
(45) Date of Patent: Mar. 7, 2006

(54) LIGHT-EMITTING DIODE LIGHTING CIRCUIT

(75) Inventor: Atsuyuki Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 10/715,470

(22) Filed: Nov. 19, 2003

(65) Prior Publication Data
US 2004/0155604 A1   Aug. 12, 2004

(30) Foreign Application Priority Data
Nov. 25, 2002 (JP) ............................ 2002-340798

(51) Int. Cl.
*H01S 3/13* (2006.01)
(52) U.S. Cl. ................. 372/38.02; 372/29.01
(58) Field of Classification Search ............ 372/38.02, 372/38.01, 38.07, 38.09, 29.011, 29.015, 372/29.016, 29.012, 29.01, 29.013
See application file for complete search history.

(56) References Cited

U.S. PATENT DOCUMENTS

| | | | | |
|---|---|---|---|---|
| 4,030,398 A | * | 6/1977 | Dittmar | .................. 84/683 |
| 5,193,108 A | * | 3/1993 | Stocklin | .................. 379/21 |
| 5,706,060 A | * | 1/1998 | Ruitenburg | ............. 348/725 |
| 5,802,089 A | * | 9/1998 | Link | .................. 372/38.02 |
| 5,970,078 A | * | 10/1999 | Walker | ............... 372/38.01 |
| 6,051,895 A | * | 4/2000 | Mercier | ................. 307/125 |
| 2002/0105373 A1 | * | 8/2002 | Sudo | ..................... 327/538 |

FOREIGN PATENT DOCUMENTS

JP    1-123483 A    5/1989

* cited by examiner

*Primary Examiner*—Minsun Oh Harvey
*Assistant Examiner*—Tuan N. Nguyen
(74) *Attorney, Agent, or Firm*—Birch, Stewart, Kolasch & Birch, LLP

(57) ABSTRACT

A lighting circuit including a circuit for preventing erroneous illumination of LEDs wherein the lighting circuit, serving as a drive circuit for the LEDs, includes a transistor and a differential amplifier placed at a preceding stage of the transistor. A positive input side of the differential amplifier is connected to a battery through a switch and to a reference resistor Rref. A voltage of the battery is divided by resistors R1 and R2 and supplied to a negative input side of the differential amplifier. A resistance value (R1/R2)×Rref is set to be smaller than a leakage resistance value Rs of the switch. Thus, the differential amplifier is not turned on when the switch is opened even though there is a leakage at the switch. Therefore, the transistor is not turned on, and the LEDs are not illuminated.

20 Claims, 2 Drawing Sheets

LIGHT-EMITTING DIODE LIGHTING CIRCUIT

CROSS-REFERENCE TO RELATED APPLICATIONS

The present application claims priority under 35 USC 119 to Japanese Patent Application No. 2002-340798 filed on Nov. 25, 2002 the entire contents thereof are hereby incorporated by reference.

BACKGROUND OF THE INVENTION

1. Field of the Invention

The present invention relates to a light-emitting diode lighting circuit. More particularly, to a light-emitting diode lighting circuit which can prevent the light-emitting diode from being erroneously illuminated due to leakage or the like of a switch which instructs the light-emitting diode to illuminate.

2. Description of Background Art

An example of a conventional light-emitting diode lighting circuit is shown in FIG. 2. In FIG. 2, light-emitting diodes (hereinafter, referred to as "LEDs") 1, 2 and 3, and resistors 4, 5 and 6 serially connected to the LEDs 1, 2 and 3, respectively, are connected to a battery 11 through a switch 7. By closing the switch 7, current flowing through the LEDs 1 to 3 and the resistors 4 to 6, and the LEDs 1 to 3 are illuminated.

It is preferable that the LEDs 1 to 3 are not illuminated when the switch 7 is opened. Nevertheless, the LEDs 1 to 3 sometimes remain illuminated due to leakage even though the switch is opened. This is because impedances are high in LEDs.

Therefore, it is considered that lighting when the switch is opened is prevented by connecting separate resistors, besides the resistors 4 to 6, to the LEDs 1 to 3 in parallel to substantially reduce the impedances of the LEDs.

Moreover, a circuit is known which includes a constant current source circuit in order not to change current flowing in the LEDs even though a voltage applied to an LED drive circuit changes as set forth in Japanese Patent Laid-Open Publication No. Heisei 1-123483.

In the example wherein the resistors are connected to the LEDs in parallel, resistance values of the connected resistors have to be reduced to a leakage resistance value of the switch 7 (80Ω, for example). Therefore, an apparent load is increased. Further, large-capacity resistors are required to prevent heating. Therefore, flexibility in layout is reduced, and the costs is increased. Meanwhile, as for the example in which a constant current source circuit is provided, the circuit becomes complicated, and the costs are likely to be increased.

Therefore, it has been demanded to prevent erroneous lighting of the LEDs with a relatively simple circuit.

SUMMARY AND OBJECTS OF THE INVENTION

In the light of the above-mentioned demand, it is an object of the present invention is to provide a LED lighting circuit which can prevent erroneous lighting of LEDs when a switch is opened, with a relatively simple circuit structure.

In order to attain the above-mentioned object, the present invention has a first characteristic in that the lighting circuit, which turns on a semiconductor switching device to illuminate at least one LED, includes a differential amplifier, a switch, a reference resistor and at least one voltage-dividing resistor. The differential amplifier is provided at a preceding stage of the semiconductor switching device. The switch inputs a supply voltage on a positive input side of the differential amplifier. The reference resistor has one end connected to the positive input side of the differential amplifier and the other end that is grounded. The voltage-dividing resistor is connected to a negative input side of the differential amplifier and divides the supply voltage. In this lighting circuit, a resistance value Rref of the reference resistor and a resistance value R1/R2 of the voltage-dividing resistor are decided such that a relationship between a leakage resistance value Rs of the switch and both resistance values Rref and R1/R2 becomes Rs>(R1/R2)×Rref.

The present invention has a second characteristic in that, the LEDs are lights for an in-vehicle lighting device, and the switch is for illuminating the lighting device.

According to the foregoing characteristics, an output of the differential amplifier is not turned on since the reference resistance value and the voltage-dividing resistance value are decided such that the resistance values of the reference resistor and the voltage-dividing resistor as well as the leakage resistor have the aforementioned relationship. Hence, the LEDs are illuminated when the switch is closed, and current does not flow through the LEDs when the switch is opened even though there is leakage at the switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
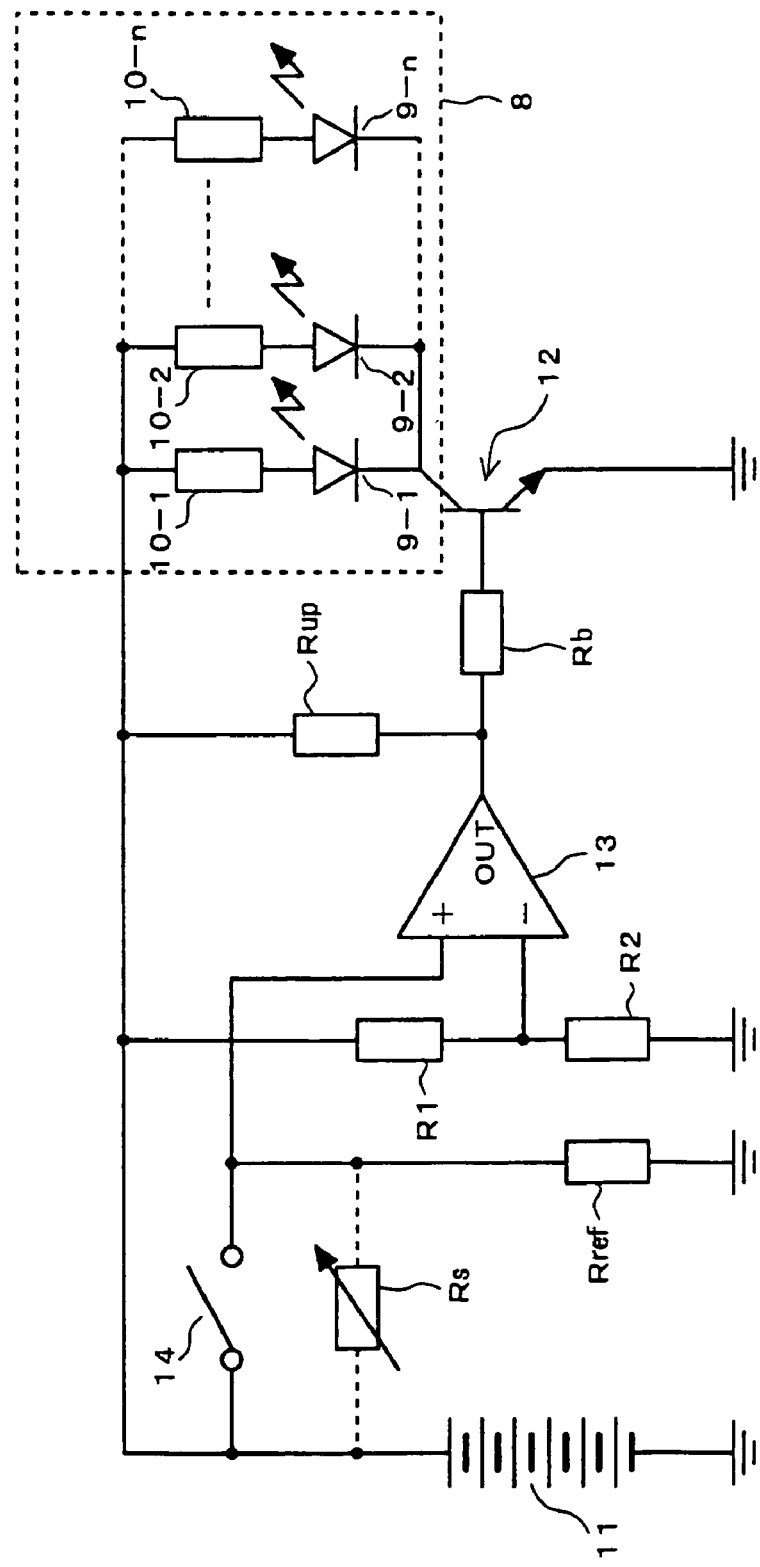
FIG. 1 is a view showing an example of a LED lighting circuit according to one embodiment of the present invention.
Figure 2:
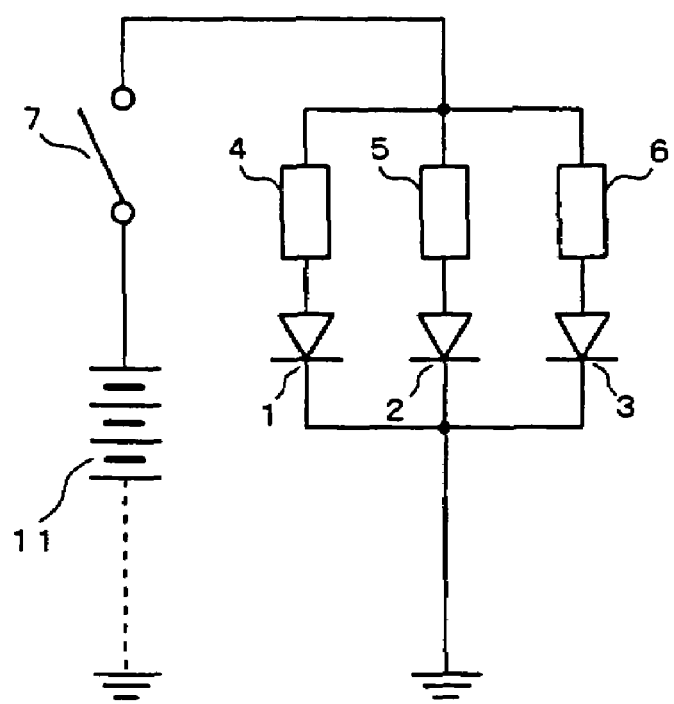
FIG. 2 is a view showing an example of a conventional LED lighting circuit.

Hereinbelow, one embodiment of the present invention will be described with reference to FIG. 1 which is a view showing an example of a LED lighting circuit. This LED lighting circuit is used as a stop lamp for a motorcycle. In this drawing, the stop lamp 8 is configured of n LEDs (twelve LEDs, for example) 9-1, 9-2, to 9n (hereinafter, referred to as "LEDs 9") and LED protective resistors 10-1, 10-2, to 10n, respectively, connected to the LEDs 9-1, 9-2, to 9n in series. An in-vehicle battery 11 is connected to an anode sides of the LEDs 9 through the LED protective resistors 10-1, 10-2, to 10n. Voltages of the battery 11 are applied to the LEDs 9.

The light circuit of the LEDs 9 has a NPN transistor 12 which serves as a semiconductor switching device and is connected to a cathode sides of the LEDs 9, and a differential amplifier 13 provided at a preceding stage of the transistor 12. The positive input side of the differential amplifier 13 is connected to the battery 11 through the switch 14, and is also grounded through the reference resistor Rref. The negative input side of the differential amplifier 13 is connected to connection ends of the resistors R1 and R2 which divide a voltage of the battery 11. The other end of the resistor R1 is connected to the battery 11, and the other end of the resistor R2 is grounded. An input protective resistor Rb is connected between an output side of the differential amplifier 13 and the base of the transistor 12. Further, the output side of the differential amplifier 13 is pulled up by the resistor Rup. The switch 14 which is interlocked with a braking operation means of a motorcycle, i.e., a brake lever or a brake pedal, is usually open, and closed while braking.

Once brakes are applied while driving, the switch 14 is closed, and the voltage of the battery 11 is applied to the positive input side of the differential amplifier 13. The voltage divided by the voltage-dividing resistors R1 and R2 is applied to the negative input side of the differential amplifier 13. Therefore, an output is produced in the differential amplifier 13 by a discrepancy between the voltages of the positive and negative input sides. Thereafter, this output is applied to the base of the transistor 12 through the input protective resistor Rb. Due to this, the transistor 12 is turned on, and current flows in the LEDs 9. Then, the LEDs 9 are illuminated.

Considering the leakage of the switch 14, both ends of the switch 14 are connected through the leakage resistor Rs even when the switch 14 is open. Therefore, a condition in which the LEDs 9 are illuminated when the switch 14 is open, that is, a condition in which the differential amplifier 13 produces an ON output is that $Rs<(R1/R2)\times Rref$ is held. Rs denotes the leakage resistance value, and R1 and R2 denote the resistance values of the voltage-dividing resistors R1 and R2.

Specifically, when the resistance value $(R1/R2)\times Rref$ is greater than the leakage resistance value Rs, there is a possibility that the LEDs 9 are illuminated even when the switch 14 is open.

Accordingly, the resistance values of the resistors R1, R2 and Rref are decided such that the resistance value $(R1/R2)\times Rref$ is smaller than the minimum value of the predicted leakage resistance Rs. The leakage resistance value Rs can be investigated in advance.

When deciding the resistance values of the resistors R1 and R2 under the above-mentioned condition, it is preferable that the voltage of the negative input side of the differential amplifier 13 is within a range of $\frac{1}{10}$ and $\frac{1}{20}$ of the supply voltage, i.e., the voltage of the battery 11.

The present invention has been described hereinabove with reference to the embodiment in which the LEDs 9 are the lights of the stop lamp for the motorcycle. However, the present invention is not limited to this embodiment, and can be broadly applied to circuits for illuminating LEDs in in-vehicle lighting devices such as a winker and a position lamp. When the LEDs are used for a winker, the switch 14 is interlocked with a turn signal operation lever. When the LEDs are used for a position lamp, the switch 14 is a switch for lighting the position lamp.

As is evident from the foregoing description, according to the invention defined in claims 1 and 2, the LEDs having high impedances are prevented from erroneous illumination, since the LED drive circuit is designed in consideration of the leakage resistance of the switch. It is not required to provide large capacity resistors connected to the LEDs in parallel, thereby resulting in higher flexibility in layout within a lamp housing. In addition, the circuit can be simplified in comparison with the case where the constant current source circuit is provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light-emitting diode lighting circuit for activating a semiconductor switching device to illuminate at least one light-emitting diode, the light-emitting diode lighting circuit comprising:
   a differential amplifier provided at a preceding stage of the semiconductor switching device;
   a switch for inputting a supply voltage to a positive input side of the differential amplifier;
   a reference resistor having one end connected to the positive input side of the differential amplifier, and the other end grounded; and
   at least one voltage-dividing resistor connected to a negative input side of the differential amplifier for dividing the supply voltage,
   wherein a resistance value Rref of the reference resistor and a resistance value R1/R2 of the voltage-dividing resistors are decided such that a relationship between a leakage resistance value Rs of the switch and both resistance values Rref and R1/R2 becomes $Rs>(R1/R2)\times Rref$.

2. The light-emitting diode lighting circuit according to claim 1, wherein the light-emitting diode is a light for an in-vehicle lighting device, and the switch is for illuminating the lighting device.

3. The light-emitting diode lighting circuit according to claim 1, and further including an input protection resistor operative connected to an output side of the differential amplifier in series with said semiconductor switching device.

4. The light-emitting diode lighting circuit according to claim 1, and further including a resistor operatively connected to an output side of the differential amplifier in series with light-emitting diode lighting circuit.

5. The light-emitting diode lighting circuit according to claim 1, wherein the semiconductor switching device is a NPN transistor.

6. The light-emitting diode lighting circuit according to claim 1, wherein the leakage value of the switch is provided by a leakage resistor operative positioned in parallel with the switch.

7. The light-emitting diode lighting circuit according to claim 1, wherein the at least one voltage-dividing resistor includes two resistors operatively positioned in series with each other.

8. The light-emitting diode lighting circuit according to claim 7, wherein the negative input side of the differential amplifier is operatively connected between the two resistors.

9. The light-emitting diode lighting circuit according to claim 1, wherein the semiconductor switching device is operatively to a cathode side of the light-emitting diode lighting circuit.

10. The light-emitting diode lighting circuit according to claim 1, wherein a voltage of the negative input side of the differential amplifier is within a range of $\frac{1}{10}$ and $\frac{1}{20}$ of a supply voltage.

11. A light-emitting diode lighting circuit comprising:
at least one light-emitting diode;
a semiconductor switching device for activating the at least one light-emitting diode to illuminate the light-emitting diode lighting circuit;
a differential amplifier operative connected between the semiconductor switching device and the at least one light-emitting diode;
a switch operatively connected to a positive input side of the differential amplifier;
a reference resistor having a first end connected to the positive input side of the differential amplifier, and the a second end grounded; and
at least one voltage-dividing resistor connected to a negative input side of the differential amplifier,
wherein a leakage resistance value Rs of the switch is greater than the resistance value Rref of the reference resistor times a resistance value of the voltage-dividing resistor.

12. The light-emitting diode lighting circuit according to claim 11, wherein the light-emitting diode is a light for an in-vehicle lighting device, and the switch is for illuminating the lighting device.

13. The light-emitting diode lighting circuit according to claim 11, and further including an input protection resistor operative connected to an output side of the differential amplifier in series with said semiconductor switching device.

14. The light-emitting diode lighting circuit according to claim 11, and further including a resistor operatively connected to an output side of the differential amplifier in series with light-emitting diode lighting circuit.

15. The light-emitting diode lighting circuit according to claim 11, wherein the semiconductor switching device is a NPN transistor.

16. The light-emitting diode lighting circuit according to claim 11, wherein the leakage value of the switch is provided by a leakage resistor operative positioned in parallel with the switch.

17. The light-emitting diode lighting circuit according to claim 11, wherein the at least one voltage-dividing resistor includes two resistors operatively positioned in series with each other.

18. The light-emitting diode lighting circuit according to claim 17, wherein the negative input side of the differential amplifier is operatively connected between the two resistors R1, R2 and the relationship between the leakage resistance value of the switch and both the resistance values Rref and R1/R2 becomes Rs>(R1/R2)×Rref.

19. The light-emitting diode lighting circuit according to claim 11, wherein the semiconductor switching device is operatively to a cathode side of the light-emitting diode lighting circuit.

20. The light-emitting diode lighting circuit according to claim 11, wherein a voltage of the negative input side of the differential amplifier is within a range of 1/10 and 1/20 of a supply voltage.

* * * * *